United States Patent [19]
Peters, Jr.

[11] Patent Number: 5,596,687
[45] Date of Patent: Jan. 21, 1997

[54] APPARATUS AND METHOD FOR ADDRESSING PIXEL VALUES WITHIN AN IMAGE PYRAMID USING A RECURSIVE TECHNIQUE

[75] Inventor: Joseph E. Peters, Jr., East Brunswick, N.J.

[73] Assignee: David Sarnoff Research Center, Inc., Princeton, N.J.

[21] Appl. No.: 282,296

[22] Filed: Jul. 29, 1994

[51] Int. Cl.$^6$ .................................................. G06T 11/00
[52] U.S. Cl. ............................................. 395/130; 395/125
[58] Field of Search .......................... 395/130, 125–129, 395/133; 382/232, 240, 276, 285, 302, 305, 306

[56] References Cited

U.S. PATENT DOCUMENTS

| | | | |
|---|---|---|---|
| 4,992,868 | 2/1991 | Holtz | 358/135 |
| 5,097,427 | 3/1992 | Lathrop et al. | 395/130 |
| 5,222,205 | 6/1993 | Larson et al. | 395/130 |
| 5,224,208 | 6/1993 | Miller, Jr. et al. | 395/125 |
| 5,361,386 | 11/1994 | Watkins et al. | 395/130 |

OTHER PUBLICATIONS

Haskell, "Interpolative, Predictive, and Pyramid Transform Coding of Color Images", ICASSP '88: Acoustics, Speech & Signal Processing Conference, 1988, pp. 785–787.

Goldberg et al, "Comparative Performance of Pyramid Data Structures for Progressive Image Transmission", IEEE Transactions on Communications, vol. 39, No. 4, Apr. 4, 1991, pp. 540–548.

Primary Examiner—Almis R. Jankus
Attorney, Agent, or Firm—William J. Burke

[57] ABSTRACT

Apparatus and a concomitant method for accessing an image pyramid that is sequentially stored in a memory. The invention uses an integer portion of the standard U, V, and D values that define a target pixel location within an image pyramid to determine a first address of a pixel value near the target location within the memory. From this first address, the invention determines another seven addresses. These eight addresses are used to recall pixel values that are proximate the target pixel location. These eight pixel values can then be used in a tri-linear interpolation to determine the target pixel value. The disclosed method and apparatus may find applicability in video servers, medical imaging, special effects and animation and location based entertainment systems among other applications.

14 Claims, 4 Drawing Sheets

APPARATUS AND METHOD FOR ADDRESSING PIXEL VALUES WITHIN AN IMAGE PYRAMID USING A RECURSIVE TECHNIQUE

The invention relates to address generators for accessing memory and, more particularly, to methods and apparatus for generating addresses to access elements or pixel values of an image pyramid stored in memory.

BACKGROUND OF THE DISCLOSURE

In computer graphics systems, three-dimensional objects are often defined as a set of polygons, which are projected to a two-dimensional screen space, e.g., a screen of a computer monitor, to give the illusion of depicting a three-dimensional object therein. For added three-dimensional realism, the polygons are "covered" with a texture that is scaled to the shape of the polygon. The operation that combines a polygon with a particular texture is known in the art as texture mapping. Specifically, a texture mapping operation combines a scaled and transformed polygon with a similarly scaled and transformed texture to achieve an illusion of three-dimensionality within a two-dimensional screen space.

Textures are typically stored in memory within the graphics system as a set of identical images each having a different level of resolution. Such an arrangement of textures is known as an image pyramid. The resolution of successive levels of a pyramid differ by a power of two such that each successive level of the pyramid has one-quarter of the pixels contained in the previous (underlying) level. In many graphics systems, each texture is represented by a plurality of color pyramids, e.g., a red pyramid, a green pyramid and a blue pyramid. Thus, for each pixel value required in the output image, or required to compute a pixel value in the output image, the graphics system produces three memory addresses and accesses three memory locations.

To generate a texture that is correctly scaled to a projected polygon, three address values for each pyramid are used to produce a pixel value at a correct location within the polygon. These values are U and V, representing Cartesian coordinates into a base image, i.e., the base of the image pyramid, and D, representing a pyramid level. As such, U, V, and D define a location of a particular pixel value within a particular image pyramid, e.g., a red pyramid.

In some instances, a pixel value necessary to produce an accurate output image may have coordinates that lie between actual pixel locations in a given level of a pyramid. Furthermore, the necessary pixel value may require a resolution that lies between levels. Consequently, the texture mapping function interpolates the nearest pixel values to determine the unknown pixel value. Specifically, for pixel values that are defined between levels of the pyramid, four pixel values in a level above the target pixel location and four pixel values below the target pixel location are tri-linearly interpolated to produce the target pixel value for the target location in an output image.

Present operations for generating locations (addresses) in memory for the eight pixel values used in the tri-linear interpolation typically require many computing cycles. Thus, the pixel selection process is relatively slow.

Therefore, a need exists in the art for an efficient apparatus and method for rapidly generating addresses of pixel values in an image pyramid.

SUMMARY OF THE INVENTION

The present invention overcomes the disadvantages heretofore associated with the prior art by selecting pixel values from an image pyramid using relatively few instruction cycles. Specifically, the invention is apparatus and a concomitant method for accessing an image pyramid that is sequentially stored in a memory. The invention uses an integer portion of the standard U, V, and D values that define a target pixel location within an image pyramid to determine a first address of a pixel value near the target location within the memory. From this first address, the invention determines another seven addresses. These eight addresses are used to recall pixel values that are proximate the target pixel location. These eight pixel values can then be used in a tri-linear interpolation to determine the target pixel value.

More specifically, the invention temporarily stores the integer portions of the U, V, and D values in registers. These values are used to determine initial values for an offset register, a base register, and a stride register. Each memory address is defined by combining the offset register value with a base register value. The base register value defines the location of the first memory location used for a particular image pyramid. All other values in that pyramid sequentially follow from that address. The offset register value determines how far from that base value a particular pixel is located in memory. As such, by updating the offset register value, any location in the pyramid can be addressed.

From the initial offset register value, the offset register value is periodically updated using the stride register value or by adding or subtracting one to/from the present offset register value. Consequently, from a given initial offset value, adding one addresses the next sequential pixel value, subtracting one addresses the previous pixel value, adding the stride value addresses a pixel in a next column of pixel values, adding the stride register value squared addresses a pixel value in the next level of the image pyramid, and so on. The invention appropriately uses the offset register value and the stride register value to efficiently generate addresses for eight pixel values in a particular image pyramid. These eight pixel values can then be used to compute the target pixel value.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
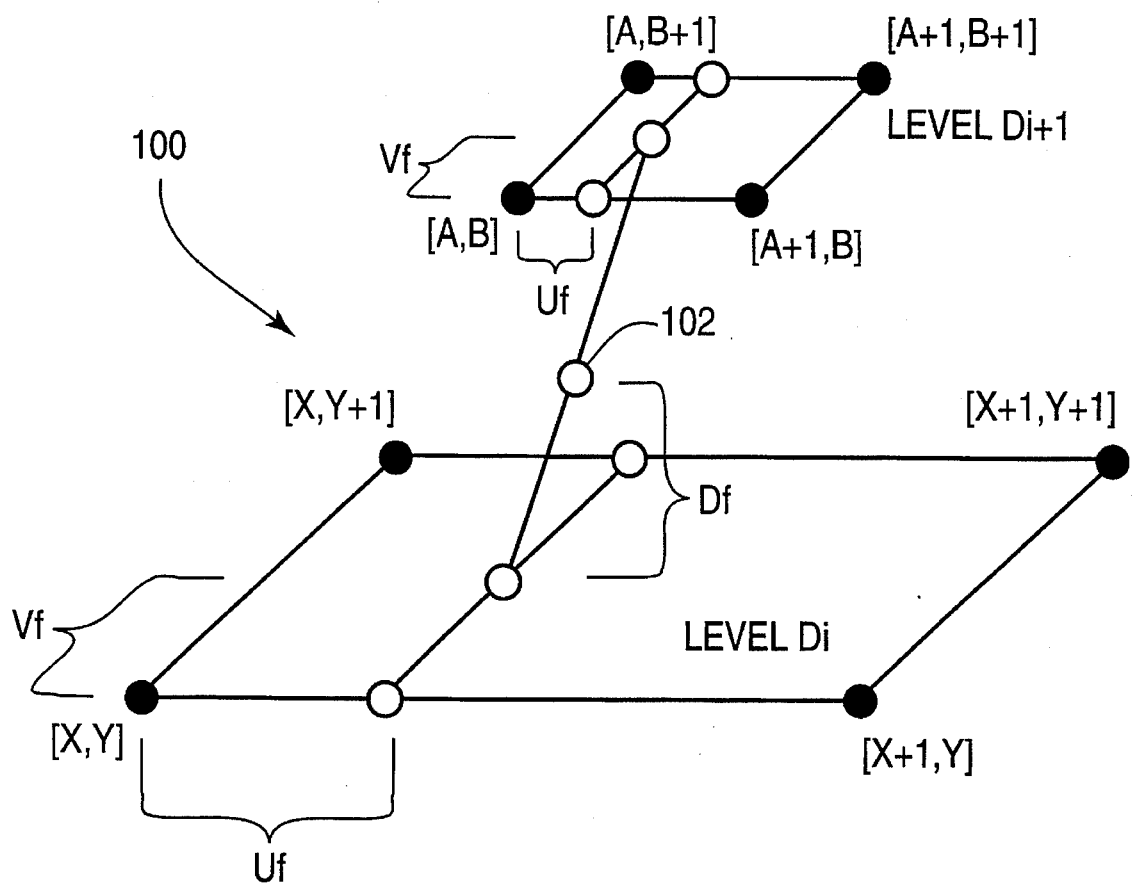
FIG. 1 shows a representation of eight pixel locations within two levels in an image pyramid that are used to compute a target pixel value located between the two levels.

FIG. 1 depicts a portion 100 of an image pyramid. This portion 100 is a portion of an image pyramid that contains a plurality of layers, e.g., five, having a number of pixels in each layer, e.g., 128 pixels in layer 1, 64 pixels in layer 2, 16 pixels in layer 3 and so on. Specifically, the depicted portion contains eight pixel locations located in two levels, i.e., four pixel locations per level. To differentiate the levels, the first level ($D_i$) uses X,Y coordinates and the second level ($D_{i+1}$) uses A,B coordinates to designates the respective locations of pixels in the respective levels. These eight pixel locations are the eight locations that are nearest a target pixel location 102. The present invention determines these eight pixel locations as memory addresses within a memory that sequentially stores all the pixel values in the pyramid. The eight pixel values located at the eight pixel memory addresses are used as interpolants in a tri-linear interpolation to determine a pixel value at the target location 102 between the known values.

Typically, image pyramids are addressed using three coordinates U, V, and D. Where U and V represent the two dimensional address of a base coordinate (corner) of the pyramid and D designates a particular level. These coordinates are respectively comprised of an integer portion (i) and a fractional portion (f). For example, U can be expressed as $U_i+U_f$, V can be expressed as $V_i+V_f$, and D can be expressed as $D_i+D_f$. Together, these coordinates determine a location within the pyramid of a target pixel location 102 and a pixel value for that location.

The present invention utilizes the integer portion of these coordinates to determine eight pixel locations and values to be used in computing a pixel value for the pixel location 102 located between the known pixel locations. The fractional portion of each coordinate is used in performing the tri-linear interpolation used to compute the pixel value. The interpolation process is a conventional operation that does not form any part of the present invention.

In most instances, there are many textures stored as image pyramids in a graphics system that utilizes the present invention. As such a parameter is necessary to identify each texture pyramid. This parameter is referred to as the texture identification (TID). As such, a table of TID, U and V values are stored in memory such that the system can access the table whenever a certain texture is requested and determine the U and V coordinates for the desired texture. The D coordinate is determined from the desired resolution at that location in the output image. Thus, for each texture request, e.g., a brick texture, the graphics system produces a TID and U, V and D coordinates.

From the TID, U, V, and D values, the present invention rapidly determines eight memory addresses that contain pixel values that are used to generate a pixel value for an output image. In discussing the present invention, it is assumed that the image pyramid to be addressed contains RGB data at each memory location, e.g., a 32 bit word. As such, the invention produces eight memory locations to enable the system to compute a pixel value. However, those skilled in the art will understand from the following discussion that if the texture data is divided amongst three (or more) pyramids, e.g., one pyramid each for red, blue and green, then the inventive address generator shall be operated thrice to produce a memory address for each pyramid. As such, the interpolation will need 24 memory locations to retrieve 24 pixel values (eight for each color).

Furthermore, the following disclosure also assumes that the image pyramid is stored in a word serial manner. In other words, the base pixel value (32-bit word) of the pyramid is stored at a particular location and the remaining pixel values for a given pyramid are sequentially stored in memory locations from the base location.

Figure 2:
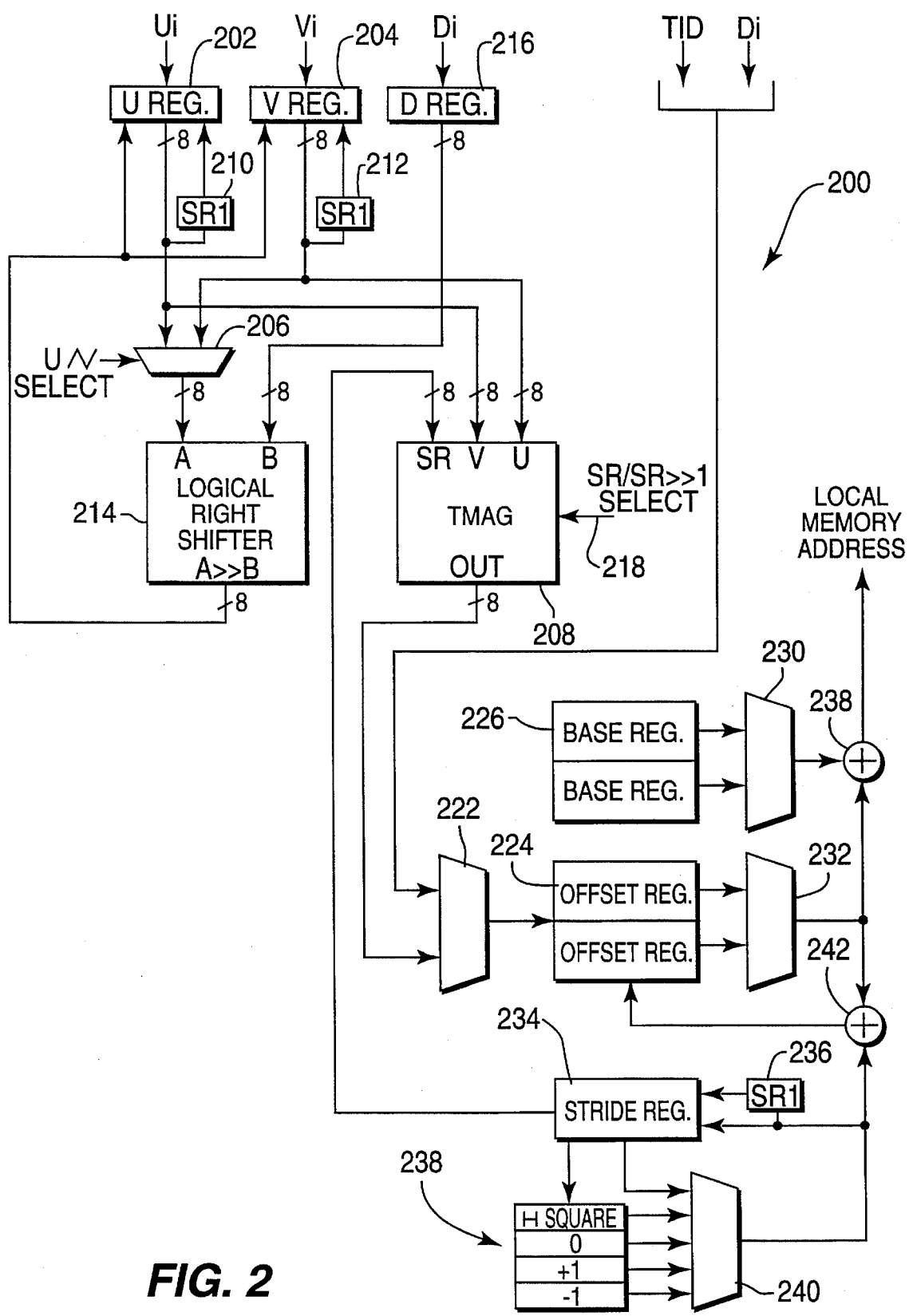
FIG. 2 depicts a block diagram of hardware used to determine eight memory addresses for pixel values to be used in computing a target pixel value located between levels in an image pyramid.

FIG. 2 depicts a block diagram of the inventive memory address generator 200. The generator can be implemented using either discrete components or within a microprocessor.

Specifically, the generator has as its input the values TID, $U_i$, $V_i$, $D_i$ and, as its output, a memory address. The $U_i$ and $V_i$ input values (8 bits each) are connected to respective U and V registers 202 and 204 for temporarily storing these values. The output terminals of each of the U and V registers are connected to a multiplexer (MUX) 206 and a texture mapping address generator (TMAG) circuit 208. The output of each register is also connected to a "shift right 1" (SR1) circuit 210 and 212 that shifts the 8 bit output one bit to the right and inserts a zero in the most significant bit location. The output of each of the SR1 circuits is connected to an input of its respective register such that the register can replace the present value in the register with the "shifted" value. One of the three inputs to each of the U and V registers are elected by a MUX (not shown) within each register block. Also, each of the registers in this block diagram have an input enable port that, when asserted by a microprocessor, enables the register to be updated with a new input value. For simplicity, the input enable ports are not shown. These ports are controlled by a microprocessor or microcontroller that ensures proper timing of the register operation to accomplish the inventive method (see FIGS. 3A and 3B).

The MUX 206 selects either the output of the U register or the output of the V register as its output. The MUX output forms an A input to a logical right shifter 214. A B input to the logical right shifter is formed by the $D_i$ value. The $D_i$ input value is temporarily stored in a D register 216 before being used as the B input to the logical right shifter 214.

The logical right shifter shifts the value at its A input by the number of bits defined by the value at its B input. As such, using the logical right shifter, either the U or V register value is shifted to the right by D bits. The output of the shifter forms another input to both the U and V registers. As such, this shifted value can be selected by either register to replace the value presently stored in the register.

As briefly mentioned above, the TMAG circuit 208 has as its input the output of the U and V registers. Additionally, a third value, a stride register value, is an input to this circuit. A select input signal on a select port 218 selects whether the stride register value is used by the TMAG circuit or whether a stride register value shifted to the right by one bit is used. In either case, the TMAG circuit uses the selected stride value and the U and V register values to generate an offset value on line 220. The specific nature of this offset value is described below with respect to step 308 of FIG. 3A.

The offset value is passed through a MUX 222 to one of a plurality of offset registers 224. Additionally, one of the plurality of offset registers stores a value formed by concatenating the TID value with the $D_i$ value.

The base registers 226 contain the memory addresses for the base locations of each pyramid. These base registers are filled as the pyramids are stored in memory, e.g., during system initialization. The base address to use is selected by MUX 230 and the particular offset register value to use is selected by MUX 232. When an address in a selected base register is combined (added together using summer 238) with a value in a selected offset register, the generator 200 produces a memory address identifying a specify pixel value location in a particular pyramid. The offset register value is controlled by the inventive generator 200 such that the eight memory locations needed for the interpolation process can be rapidly determined.

The stride register 234 is initially loaded with a value equivalent to the number of pixels in a row of pixels within a pyramid level indicated by $D_i$. As such, the value of the stride register is always a power of 2, e.g., 2, 4, 8, 16, 32, and so on. This value is updated with either the present value of the register shifted to the right by one bit, e.g., using the right shift circuit 236, the square of the present value, the same value, the present value plus one, or the present value minus one. These optional replacement values are selected from value processor 238 through a MUX 240.

The square of the present stride register value is computed using a novel approach. Specifically, to produce the square of the 8-bit stride register value, the processor 238 performs a permutation of the present stride register value with eight zeros, as follows:

$$\begin{array}{cc} SR & SR \times SR \\ abcdefgh \longrightarrow & 0a0b0c0d0e0f0g0h \end{array}$$

The present value of the stride register is combined (using summer 242) with the present value of the offset register and then used to replace the present value of the offset register. Additionally, as stated previously, the present value of the stride register is also used as an input to the TMAG circuit 208.

By combining the updated value of the offset register with the base register value for the selected pyramid, a memory address is generated. With each update of the offset register, a new memory location is generated. As such, the address generator 200 sequentially generates all eight address locations.

Figure 3A:
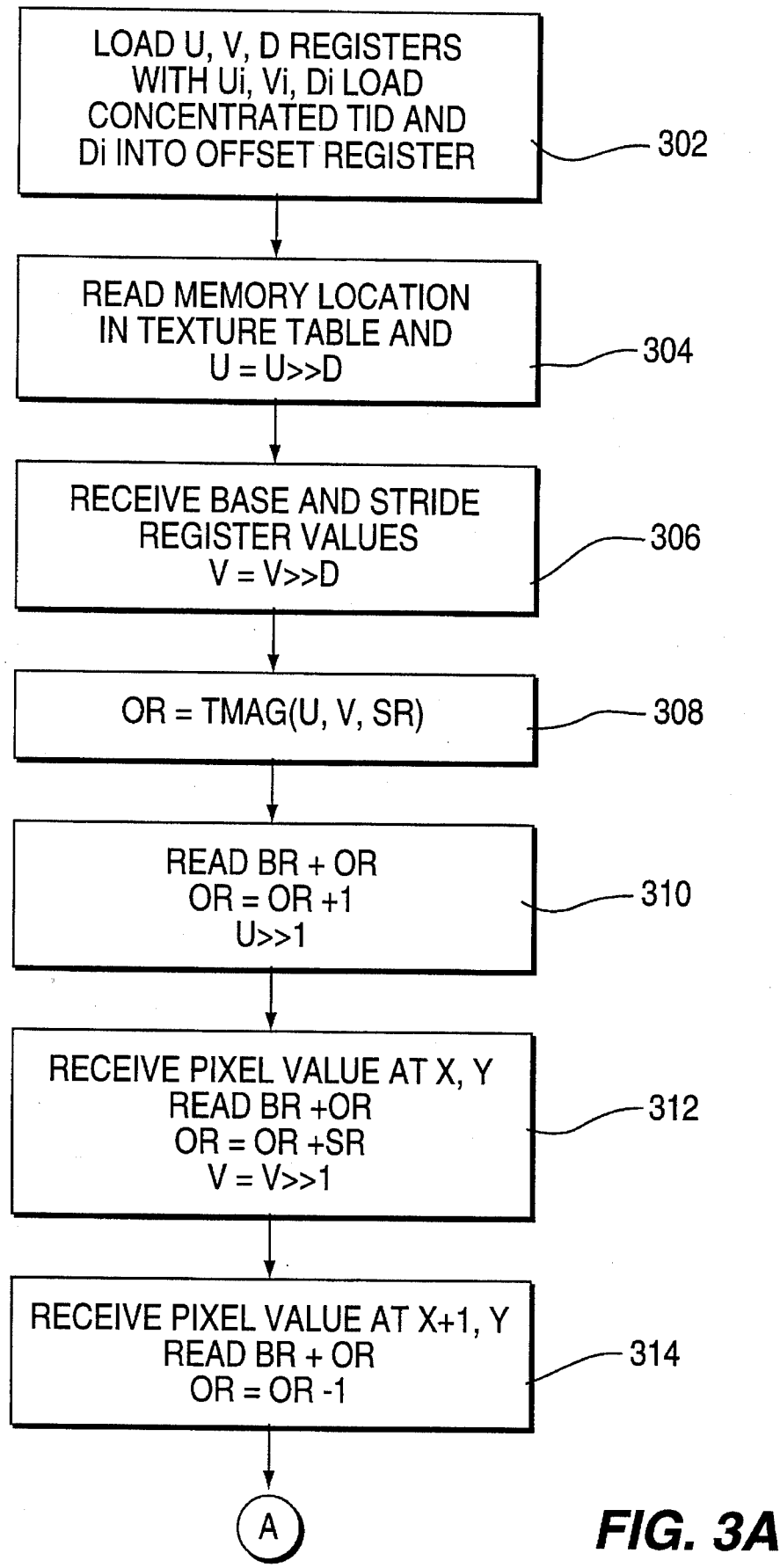
FIGS. 3A and B, taken together, depict a flow chart of a routine illustrating the operation of the hardware of FIG. 2.
Figure 3B:
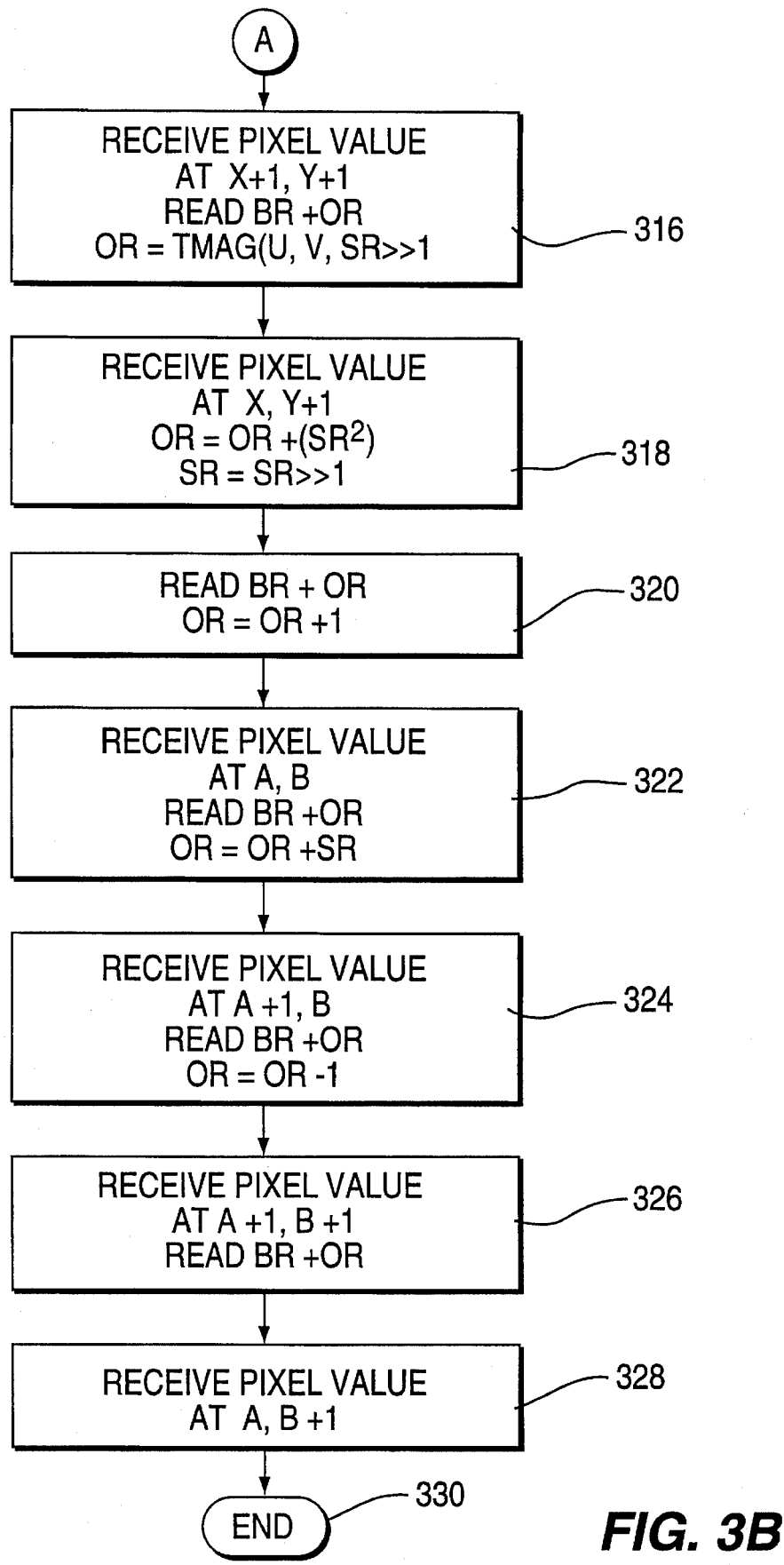

A routine 300 representing the process by which the address generator 200 shown in FIG. 2 produces the eight addresses is shown as a flow chart on FIGS. 3A and B. Passing once through this routine produces eight addresses, e.g., memory addresses for pixel locations X,Y; X+1,Y; X,Y+1; X+1,Y+1; A,B; A+1,B; A,B+1; and A+1,B+1. Thus, for each pixel value required in an output image, the routine is utilized once. Thereafter, the graphics system interpolates these eight values to determine a desired pixel value for the output image. To illustrate the efficiency of the inventive routine, each block in the flow chart represents the passage of a single instruction cycle of a microprocessor controlling the operation and timing of the address generator. Thus, the entire routine is accomplished in fourteen instruction cycles.

Specifically, the routine begins at step 302 wherein the values of $U_i$, $V_i$, $D_i$ are respectively loaded into the U, V and D registers. Simultaneously, the values of TID and $D_i$ are concatenated and stored in one of the offset registers, i.e., as a pointer to a base value of a particular level within a particular pyramid. It is assumed that the base values of each texture pyramid are stored in the base registers upon system initialization; however, a base value for a particular level is produced using this concatenation. A MUX then selects an appropriate texture pyramid base register in accordance with the TID. At step 304, using the selected texture pyramid base value and the initial offset register value (TID, $D_i$), the routine reads a memory address containing a base value for a particular pyramid level, e.g., the address of a corner of the level, and a value that represents the number of pixels in a row of that pyramid level. The base value is then stored in a base register and the number of pixels is stored in the stride register. These values are addressed in this step 304, but are not received until step 306. Simultaneously with reading the memory location, the value in the U register is shifted by D bits.

At step 306, the base register value and the stride register value requested in the previous step are returned from memory and respectively stored in a selected base register and stride register. Typically, these values are returned from memory as a "packed" value, i.e., both values are contained within a single word. Simultaneously, within this step, the value of the V register is shifted to the right by D bits.

At step 308, the offset register (OR) is updated with a new value (a linear offset from the base value of the level) based upon a "TMAG" function of U, V and the stride register (SR) value. The TMAG function combines the U and V values, two 8-bit words, depending upon the present value in the stride register. Specifically, if U is assumed to have the form ABCDEFGH and V is assumed to have the form QRSTUVWX, U and V are combined as shown in Table 1 below.

TABLE 1

| TMAG circuit function table | | | |
|---|---|---|---|
| U | V | SR value | TMAG Output |
| ABCDEFGH | QRSTUVWX | 256 (10000000) | ABCDEFGHQRSTUVWX |
| ABCDEFGH | QRSTUVWX | 128 (01000000) | 00BCDEFGHRSTUVWX |
| ABCDEFGH | QRSTUVWX | 64 (00100000) | 0000CDEFGHSTUVWX |
| ABCDEFGH | QRSTUVWX | 32 (00010000) | 000000DEFGHTUVWX |
| ABCDEFGH | QRSTUVWX | 16 (00001000) | 00000000EFGHUVWX |
| ABCDEFGH | QRSTUVWX | 8 (00000100) | 0000000000FGHVWX |
| ABCDEFGH | QRSTUVWX | 4 (00000010) | 000000000000GHWX |
| ABCDEFGH | QRSTUVWX | 2 (00000001) | 00000000000000HX |

As shown, the output of the TMAG circuit is a concatenation of the U and V values in a manner that is defined by the stride register value. Specifically, the 16-bit output word is a concatenation of the lower B-bits of U and V, where B=log(N) and N is the stride register value. The TMAG circuit output is stored in the offset register replacing any prior value stored therein.

At step 310, the routine reads the memory location at an address defined by the base register (BR) value plus the offset register (OR) value. This address is the location of the pixel value at location X, Y (see FIG. 1). Simultaneously, the offset register value is incremented by 1 and the U value is right shifted (U>>1), e.g., the bits of the U value are shifted to the right one bit, the least significant bit is dropped and the most significant bit becomes a zero.

At step 312, the routine receives the pixel value at location X,Y that was requested in the previous step. Typically, the pixel value would be stored in a register or memory location for subsequent use in an interpolation function.

Additionally, within this instruction cycle, the routine reads the next pixel value located at the address indicated by the base register value plus the offset register value (BR+OR). This is the pixel located at location X+1,Y. Simultaneously, the offset register is again updated, this time with the stride register (SR) value and the V value is right shifted (V>>1).

At step 314, the routine receives the pixel value at location X+1,Y that was previously read, reads the pixel value at the location defined by the base register value plus the offset register value, and decrements the offset register value by 1.

At step 316, the routine receives the pixel value at the location X+1,Y+1, reads the pixel value at the location defined by the base register value plus the offset register value, and updates the offset register with a value defined by the TMAG circuit. Specifically, the TMAG function, i.e., the concatenation of the B low bits of the U and V value, is accomplished using the right shifted stride value (SR>>1) to define the variable B.

At step 318, the routine receives the pixel value located at location X,Y+1, updates the offset register value with a combination of the previous offset register value plus the square of the stride register value, and right shifts the stride register value. The square of the stride register value defines a location that is one pyramid level above the previously used pyramid level. At this step in the routine, all four pixel values (X,Y; X+1,Y; X+1, Y+1; X,Y+1) in the $D_i$ level of FIG. 1 have been received from memory. The new offset register value facilitates reading the four pixel values in the next higher pyramid level, level $D_{i+1}$.

At step 320, the routine reads the pixel value at an address defined by the base register value plus the offset register value. Simultaneously, the routine updates the offset register value by incrementing the present value by 1.

At step 322, the routine receives the pixel value at the location A,B in level $D_{i+1}$ that was read in the previous step, reads a new pixel value at an address defined by the base register value plus the offset register value, and updates the offset register value with the present offset register value plus the stride register value.

At step 324, the routine receives the pixel value at location A+1,B that was read during the previous step, reads a new pixel value at an address defined by the base register value plus the offset register value, and updates the offset register value by decrementing the present value by 1.

At step 326, the routine receives the pixel value at location A+1,B+1 that was read during the previous step and reads the pixel value at the address defined by the base register value plus the offset register value.

At step 328, the routine receives the pixel value at location A,B+1. At this point, the routine has addressed and received all eight pixel values necessary to perform a tri-linear interpolation and produce an appropriate target pixel value. Consequently, the routine ends at step 330.

To best understand the present invention, an example of the foregoing routine in operation is presented below. The example assumes the following values have been provided by a graphics system (e.g., a microprocessor based system controlling the inventive apparatus) requesting a target pixel value: D is 2.25; U is 9.125; V is 15.75; and TID is 5. Also the initial base and stride values are received by the address generator as a packed 32-bit word that indicates the corner of a selected pyramid level (base) and the length of a row in that level (stride). For the following example the initial base, stride values are [1000,8], for level 2 of the pyramid.

As shown below in Tables 2 and 3, Level 2 of the pyramid is stored in memory addresses 1000 through 1063 and level 3 of the pyramid is stored in memory addresses 1064 through 1079.

TABLE 2

| ADDRESS | 0 | 1 | 2 | 3 | 4 | 5 | 6 | 7 |
|---|---|---|---|---|---|---|---|---|
| 1000 | — | — | — | — | — | — | — | — |
| 1008 | — | — | — | — | — | — | — | — |
| 1016 | — | — | — | — | — | — | — | — |
| 1024 | — | — | 1 | 2 | — | — | — | — |
| 1032 | — | — | 3 | 4 | — | — | — | — |
| 1040 | — | — | — | — | — | — | — | — |
| 1048 | — | — | — | — | — | — | — | — |
| 1056 | — | — | — | — | — | — | — | — |

Representation of Level 2 of an Illustrative Image Pyramid

TABLE 3

| ADDRESS | 0 | 1 | 2 | 3 |
|---|---|---|---|---|
| 1064 | — | — | — | — |
| 1068 | — | 5 | 6 | — |
| 1072 | — | 8 | 7 | — |
| 1076 | — | — | — | — |

Representation of Level 3 of an Illustrative Image Pyramid

The numerals within the tables indicate the order in which the pixel values are determined by the routine. The dashes represent arbitrary pixel values that are not of concern to the present invention. Returning now to FIG. 3, at step 302, the integer values of U, V, and D are stored in their appropriate registers and the concatenated TID and $D_i$ values (512= $101_2|010_2$=42) are loaded into an offset register.

At step 304, the routine reads a memory location containing a pyramid level base value and the stride value for that level by using the initial base and offset register values, e.g., a texture table base value represented by TID and the offset (42), and shifts the U value to the right by D bits, e.g., 9>>2=2.

At step 306, the memory returns, within a single packed data word, the pyramid level base value (1000) and a stride register value (8). The packed values are separated and stored in their appropriate register. Additionally, the V value is right shifted by D bits (15>>2=3).

At step 308, the TMAG operation is performed to generate a new offset register value (OR=TMAG (U, V, SR)= TMAG (2, 3, 8)=$011010_2$=26). At step 310, the new offset register value is added to the base register value to generate a memory address (BR+OR=1000+26=1026). This is the address of the first pixel value (value 1 in Table 1). Additionally, the offset register is incremented by 1 (OR+1=26+ 1=27) and the U value is right shifted by 1 (U>>1=2>>1=1).

At step 312, the memory returns with pixel value 1, a new memory address is generated (BR+OR=1000+27=1027), the offset register is updated (OR+SR=27+8=35), and the V value is right shifted by 1 (V>>1=3>>1=1). At step 314, pixel value 2 is returned from memory, a new memory address is produced (BR+OR=1000+35=1035), and the offset register is decremented by 1 (OR−1=35−1=34).

At step 316, the memory returns pixel value 3, a new memory address is generated (BR+OR=1000+34=1034), the TMAG operation is performed to produce a new offset register value (OR=TMAG(U, V, SR>>1)=TMAG(1, 1, 4)=$0101_2$=5).

At step 318, the memory returns pixel value 4, the offset register is updated using the square of the stride register value (OR+SR*SR=5+64=69) and the stride register value is shifted to the right by 1 (SR>>1=8>>1=4). At step 320, a new memory address is produced (BR+OR=1000+69=1069) and the offset register is incremented by 1 (OR+1=5+1=6). At step 322, the memory returns pixel value 5 in level 3 (table 2), a new memory address is generated (BR+OR=1070), and the offset register value is incremented by the stride register value (OR+SR=6+4=10. At step 324, the memory returns pixel value 6, the next memory location is read (BR+OR=1074) and the offset register value is decremented by 1 (OR-1=9). At step 326, the memory returns pixel value 7 and the next memory location, at address 1073, is read. Lastly, at step 328, the memory returns pixel value 8. At this time, all eight pixel values from memory locations 1026, 1027, 1034, 1035, 1069, 1070, 1073, and 1074 have been addressed and recalled from memory using fourteen instruction cycles of a microprocessor that either controls the apparatus of FIG. 2 or has the apparatus contained therein.

Although one embodiment which incorporates the teachings of the present invention has been shown and described in detail herein, those skilled in the art can readily devise many other varied embodiments that still incorporate these teachings.

The disclosed method and apparatus may find applicability in video servers, medical imaging, special effects and animation and location based entertainment systems among other applications.

What is claimed is:

1. A method for generating addresses to access an image pyramid of pixel values sequentially stored in a memory, said method comprising the steps of:

temporarily storing an integer portion of each of a plurality of image pyramid address values;

determining from said plurality of integer portions a first memory address for a first pixel value in said memory;

determining, from said first memory address, a second memory address for a second pixel value in said memory;

determining, from said second memory address, a third memory address for a third pixel value in said memory;

determining, from said third memory address, a fourth memory address for a fourth pixel value in said memory;

determining, from said fourth memory address, a fifth memory address for a fifth pixel value in said memory;

determining, from said fifth memory address, a sixth memory address for a sixth pixel value in said memory;

determining, from said sixth memory address, a seventh memory address for a seventh pixel value in said memory;

determining, from said seventh memory address, an eighth memory address for an eighth pixel value in said memory.

2. The method of claim 1 wherein said first, second, third, and fourth pixel values are contained in a first level of said image pyramid and said fifth, sixth, seventh, and eighth pixel values are contained in a second level of said image pyramid.

3. The method of claim 2 wherein said step of determining said fifth memory address further comprises adding to said fourth memory address a number of pixel values contained in said first level of said image pyramid.

4. A method for generating addresses to access an image pyramid of pixel values sequentially stored in a memory, said method comprising the steps of:

(a) temporarily storing the integer portions of a plurality of address values that define a target location of a pixel value in said image pyramid;

(b) initializing, in response to said integer portions, a base value, an offset value, and a stride value, where said base value represents a reference address of a reference pixel value within said pyramid, said offset value represents a number of pixel values to be added to the base value to compute an address value of a particular pixel value within the image pyramid, and the stride value is a number of pixel values in a row of pixel values within a specific level of the image pyramid;

(c) storing said base value in a base register;

(d) storing said offset value in an offset register;

(e) storing said stride value in a stride register;

(f) generating a memory address by combining the base value with the offset value;

(g) updating said offset value and said stride value and respectively storing the updated offset and stride values in the offset and stride registers; and (h) repeating steps (f) and (g) until a plurality of memory addresses are generated for accessing said pixel values in said image pyramid.

5. The method of claim 4 wherein said updating step (g) further comprises the steps of:

combining integer portions of a U address value and a V address value which together represent Cartesian coordinates of an address value within a base level of the image pyramid, in response to the present stride value, to produce an updated offset value; and storing said updated offset value in said offset register.

6. The method of claim 5 wherein said combining step further comprises the step of:

truncating B most significant bits of the U and V address values to form truncated U and V address values, where B=log(N) and N is the stride value;

concatenating the truncated U and V address values; and filling the most significant bit positions of the concatenated, truncated U and V address values with zeros.

7. The method of claim 4 wherein said updating step further comprises the steps of:

computing the square of the stride value by interposing zeros between bit positions in the stride value; and updating the offset register by adding the squared stride value to the present offset register value.

8. Apparatus for generating addresses to access an image pyramid of pixel values sequentially stored in a memory, said apparatus comprising:

means for temporarily storing an integer portion of each of a plurality of image pyramid address values;

means for determining from said plurality of integer portions a first memory address for a first pixel value in said memory;

means for determining, from said first memory address, a second memory address for a second pixel value in said memory;

means for determining, from said second memory address, a third memory address for a third pixel value in said memory;

means for determining, from said third memory address, a fourth memory address for a fourth pixel value in said memory;

means for determining, from said fourth memory address, a fifth memory address for a fifth pixel value in said memory;

means for determining, from said fifth memory address, a sixth memory address for a sixth pixel value in said memory;

means for determining, from said sixth memory address, a seventh memory address for a seventh pixel value in said memory;

means for determining, from said seventh memory address, an eighth memory address for an eighth pixel value in said memory.

9. The apparatus of claim 8 wherein said first, second, third, and fourth pixel values are contained in a first level of said image pyramid and said fifth, sixth, seventh, and eighth pixel values are contained in a second level of said image pyramid.

10. The apparatus of claim 9 wherein said means for determining said fifth memory address further comprises means for adding to said fourth memory address a number of pixel values contained in said first level of said image pyramid.

11. Apparatus for generating addresses to access an image pyramid of pixel values sequentially stored in a memory, said apparatus comprising:

(a) means for temporarily storing the integer portions of a plurality of address values that define a target location of a pixel value in said image pyramid;

(b) means for initializing, in response to said integer portions, a base value, an offset value, and a stride value, where said base value represents a reference address of a reference pixel value within said pyramid, said offset value represents a number of pixel values to be added to the base value to compute an address value of a particular pixel value within the image pyramid, and the stride value is a number of pixel values in a row of pixel values within a specific level of the image pyramid;

(c) means for storing said base value in a base register;

(d) means for storing said offset value in an offset register;

(e) means for storing said stride value in a stride register;

(f) means for generating a memory address by combining the base value with the offset value;

(g) means for updating said offset value and said stride value and respectively storing the updated offset and stride values in the offset and stride registers; and (h) means for repetitively operating said generating means and said updating means until a plurality of memory addresses are generated for accessing said pixel values in said image pyramid.

12. The apparatus of claim 11 wherein said updating means further comprises:

means for combining integer portions of a U address value and a V address value which together represent Cartesian coordinates of an address value within a base level of the image pyramid, in response to the present stride value, to produce an updated offset value; and means for storing said updated offset value in said offset register.

13. The apparatus of claim 12 wherein said combining means further comprises:

means for truncating B most significant bits of the U and V address values to form truncated U and V address values, where B=log(N) and N is the stride value;

means for concatenating the truncated U and V address values; and means for filling the most significant bit positions of the concatenated, truncated U and V address values with zeros.

14. The apparatus of claim 11 wherein said updating means further comprises:

means for computing the square of the stride value by interposing zeros between bit positions in the stride value; and means for updating the offset register by adding the squared stride value to the present offset register value.

* * * * *